April 8, 1958 W. H. TROEMEL 2,829,736
MACHINE OILING SYSTEM
Filed Jan. 7, 1955 2 Sheets-Sheet 1

INVENTOR.
WALTER H. TROEMEL,
BY: Harold B. Hood.
ATTORNEY

April 8, 1958

W. H. TROEMEL 2,829,736

MACHINE OILING SYSTEM

Filed Jan. 7, 1955

INVENTOR.
WALTER H. TROEMEL,
BY: Harold B. Hood.
ATTORNEY

United States Patent Office 2,829,736
Patented Apr. 8, 1958

2,829,736

MACHINE OILING SYSTEM

Walter H. Troemel, Columbus, Ind., assignor, by mesne assignments, to The Reliance Electric and Engineering Company, Cleveland, Ohio, a corporation of Ohio Application January 7, 1955, Serial No. 480,477

9 Claims. (Cl. 184—13)

The present invention relates to a machine oiling system, and is particularly concerned with providing lubrication for a gear reduction unit, or the like, in which one of the shafts of the unit must project through the lower portion of the unit case. More specifically, the invention finds its primary use in a system of the character indicated in which the speed at which the gearing is driven may vary through a wide range. In such a system, conventional lubricant-slinger devices will be ineffective to provide satisfactory lubrication near the bottom of the speed range, and will produce foaming near the top of the speed range; and, in such a system, it is impractical to submerge the gears in a lubricant bath because of heating problems and because of the problem of leakage past the packing of the shaft projecting through the lower part of the casing.

A further object of the invention, then, is to provide, for such a system, novel means for bathing the gearing in lubricant, while avoiding any major problem of leakage of lubricant from the casing.

A still further object of the invention is to provide novel and simple means for lubricating the gears in such a unit, regardless of the direction of rotation of the shafts, while avoiding substantial agitation of the main body of lubricant in the reservoir pool.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
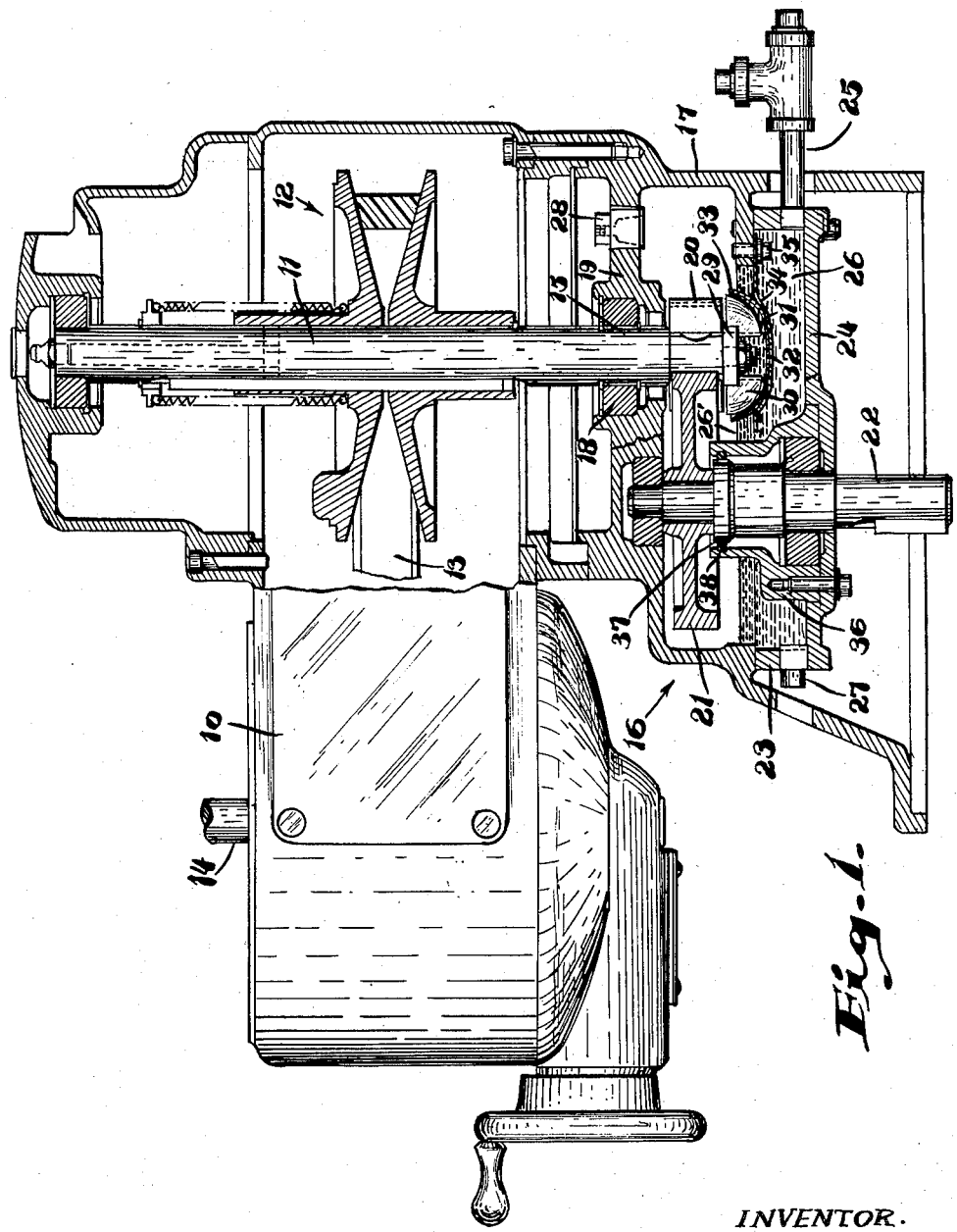
Fig. 1 is an elevation, partly in section, of a speed varying transmission of conventional form, with which is associated a gear reducing unit embodying the oiling system of the present invention.

Referring more particularly to the drawings, it will be seen that I have illustrated a housing 10 in which is journalled a vertical shaft 11 carrying an expansible V-pulley 12 which is drivingly connected, through a V-belt 13, with a companion expansible V-pulley (not shown) on the input shaft 14 of the transmission. The shaft 11 has a lower extension 15 which projects outside the casing 10 and into the gear case 17 of a gear reduction unit indicated generally by the reference numeral 16. The shaft extension 15 is journalled in a bearing 18 supported in a wall 19 of the casing 17, and its lower extremity is housed within the case 17, where it carries a pinion 20 meshing with a gear 21 carried on the output shaft 22 of the unit 16, which shaft 22 projects through the bottom wall 24 of a lubricant reservoir 23 supported within the case 17. A supply pipe 25 is illustrated, through which a pool 26 of liquid lubricant may be supplied to the reservoir 23, the lubricant level being maintained normally as indicated at 26'. I have shown a drain plug 27; and preferably a vent 28 is supported in the top wall 19 of the case 17.

The define my novel lubricant slinger, the shaft extension 15 carries, at its lower end and below the pinion 20, an element 29 provided with a peripheral series of blades 30, said blades dipping below the level 26' of the lubricant pool 26. A cup shaped shroud 31 underlies the element 29, its flaring annular wall extending slightly above the lubricant level 26' to define an open upper end 33; and said shroud is provided with a central inlet port 32 disposed well below the liquid level 26'. As shown, the shroud 31 may be supported in place by means of a bracket 34 suitably secured to a baffle formed in the case 17.

It will be apparent that, as the shaft 11 is rotated to drive the element 29, its blades, in cooperation with the shroud 31, will act substantially as a centrifugal pump, driving the lubricant, which enters the shroud through the port 32 at a rate largely determined by the area of the port and the static head of the lubricant pool, to follow the contour of the shroud 31 and to be discharged, as an annular curtain, generally upwardly and outwardly from the open mouth 33 of the shroud. Thereby, the gear means 20 and 21 is bathed in a spray of lubricant.

Figure 2:
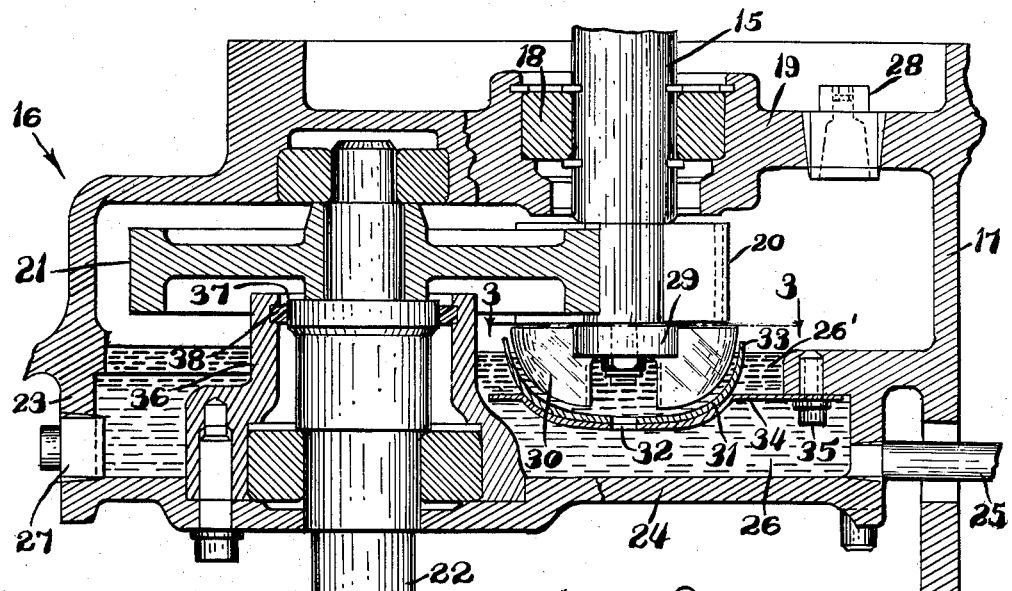
Fig. 2 is an enlarged, fragmentary sectional view, showing the details of a presently-preferred form of my improved lubricant slinger.

It will be seen, from Fig. 2, that the shroud 31 is formed to provide a substantially flat-bottomed bowl whose annular wall is substantially a 90° circular arc, the center of which lies in the perpendicular intersection of the horizontal plane of the shroud mouth 33 with a vertical cylinder including the periphery of the substantially flat bowl bottom. It will further be seen that the distal edge of each blade 30 is substantially a 90° circular arc, on a very slightly shorter radius, whose center lies in the intersection of the same cylinder with a slightly higher horizontal plane. As a consequence, the blade edges gradually approach the annular wall of the shroud, from their bottom ends to their top ends; and as the whirling liquid within the shroud approaches its open mouth, the liquid is accelerated and, further, is broken into a spray which leaves the shroud primarily in the form of an upwardly- and outwardly-arching curtain moving generally tangentially relative to the shroud mouth.

I have found that it is important, to the accomplishment of my objectives, that the upper edges of the blades 30 be disposed slightly above the plane of the shroud mouth; and that the degree of such upward projection of the blades substantially affects the action of the slinger. I presently believe that this projection largely controls the horizontal component of the velocity at which the lubricant is discharged from the slinger; and that it also has a substantial effect upon the ratio between mist and globules in the composition of the lubricant so delivered. In tests conducted with a shroud whose inside mouth diameter was 2 5/32" and a rotor whose blade diameter was 2 3/32", it was determined that, with the shroud mouth located 3/16" above the reservoir oil level, a projection of the blades above the shroud mouth of 1/16" gave optimum results. An increase in such projection tends to increase the average size of the particles in the spray and to increase foaming in the reservoir to an undesirable extent; while a reduction in the degree of projection undesirably reduces the height to which the lubricant spray is lifted above the shroud mouth and increases the amount of submerged foaming in the reservoir.

In a typical test run, under the optimum conditions outlined above, the following results were noted:

| Rotor, R. P. M. | Maximum Elevation of Spray Above Shroud Mouth, inches | Splatter | Height, inches | Depth of Submerged Foam, inches | Depth of Floating Foam, inches |
|---|---|---|---|---|---|
| 425 | 5/16 | 0 | 0 | 0 | 0 |
| 470 | 7/16 | 0 | 0 | 0 | 0 |
| 500 | 5/8 | 0 | 0 | 0 | 0 |
| 700 | 1 | Traces | 3/4 | 1/16 | 0 |
| 800 | 1 1/8 | ---do--- | 1 | 1/8 | 0 |
| 900 | 1 1/4 | Light | 1 1/8 | 1/4 | 1/64 |
| 1,000 | 1 1/4 | ---do--- | 1 1/4 | 3/8 | 1/64 |
| 1,200 | 1 1/4 | ---do--- | 1 1/4 | 1/2 | 1/64 |
| 1,400 | 1 1/4 | ---do--- | 1 1/4 | 3/4 | 1/64 |
| 1,600 | 1 1/8 | ---do--- | 1 1/2 | 1 | 1/64 |
| 2,000 | 1 1/8 | ---do--- | 1 1/2 | 1 | 1/64 |
| 2,500 | 1 1/8 | ---do--- | 1 1/2 | 1 | 1/64 |
| 3,000 | 1 1/8 | Good | 1 3/4 | 1 1/8 | 3/64 |
| 4,000 | 1 1/8 | ---do--- | 1 3/4 | 1 1/8 | 3/64 |
| 4,590 | 1 1/8 | ---do--- | 1 3/4 | 1 1/8 | 3/64 |

Figure 3:
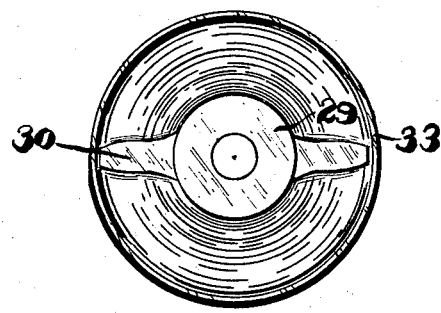
Fig. 3 is a further-enlarged, fragmentary, horizontal section, taken substantially on the line 3—3 of Fig. 2.

I presently consider the blade shape illustrated in Fig. 3 to be optimum; but good results can be obtained with other shapes. For instance, I have successfully used blades which are of uniform thickness from root to toe, blades whose leading faces are substantially cylindrically concave on vertical axes, and blades having flat front faces and arcuately-convexly tapering rear faces.

I prefer to provide a standpipe 36 which is suitably secured to the bottom wall 24 of the reservoir 23 with a fluid-tight seal, said standpipe surrounding the shaft 22 and having its open mouth 37 disposed substantially above the lubricant level 26'. By this means, I avoid any static head of lubricant upon the packing or bearing for the shaft 22; and, since the gear 21 is in rotation at all times when the element 29 is acting to throw lubricant, the upper end of the standpipe is reasonably well protected against the deposit therein of any substantial amount of lubricant. However, I prefer to provide a packing 38 near the open, upper end of the standpipe, thus further protecting the system against lubricant leakage around the shaft 22.

I claim as my invention:

1. In a device of the class described, a casing, a shaft projecting from the lower portion of said casing, a second shaft journalled in said casing on a substantially vertical axis, cooperating drive means in said casing and including an element fixed to rotate with one of said shafts and means rotating with the other of said shafts and drivingly associated with said element, a bladed element fixed to rotate with said second shaft, and a cup-shaped shroud, open at its top, partially enclosing said bladed element and having an intake port in its bottom, the blades of said bladed element extending above the top of said shroud but terminating below said cooperative drive means, said casing containing a bath of liquid extending to a level above said port and above the lower ends of said blades but below the open top of said shroud.

2. In a device of the class described, a casing, a first vertical shaft having a portion disposed in said casing and projecting through the bottom wall of said casing, a second vertical shaft projecting through the top wall of said casing and having an end suspended in said casing above the bottom wall thereof, cooperating gear means in said casing mounted on said shafts, a bladed element fixed to rotate with said second vertical shaft, and a cup-shaped shroud underlying said end of said second shaft within said casing and having annularly-flaring walls surrounding said bladed element and extending to a level above that of a pool of liquid lubricant contained in said casing but terminating below the level of said gear means, the blades of said bladed element extending above the open, upper end of said shroud, and below the level of said pool, said shroud being formed with an inlet port below the level of said lubricant pool, said gear means being disposed wholly above the said lubricant level.

3. A speed-varying transmission, a vertical shaft carrying an expansible V-pulley, a gear case enclosing the lower end of said shaft and having a bottom wall spaced below said shaft end, a bladed element carried at the lower end of said shaft and extending below the level of a pool of liquid lubricant enclosed in said case, a cup-shaped shroud supported in said case and partially enshrouding said bladed element, the bottom of said shroud being disposed below the lubricant level and the open top thereof extending above said level, said shroud being formed with an inlet port below said level, the blades of said bladed element extending to a level above the open top of said shroud, a second vertical shaft having a portion disposed in said case and projecting through the bottom wall of said case, gear means in said case disposed wholly above said blades, providing a driving connection between said shafts and disposed above said lubricant level, and a standpipe having a liquid-tight seal with said bottom wall, surrounding said second shaft within said case, and having an open top disposed above said lubricant level.

4. In a device of the class described, a first vertical shaft, a gear case receiving the lower end of said shaft with the bottom wall of said case spaced below the said shaft end, a bladed element carried on said shaft end, the blades of said element being substantially radially disposed and extending vertically above and below the level of a pool of liquid lubricant in said case, gear means carried on said shaft above said bladed element, a cup-shaped shroud supported in said case and partially enshrouding said bladed element, the bottom of said shroud being disposed below the lubricant level and the flaring, annular wall of said shroud extending above said level, but terminating below the upper ends of said blades, said shroud being formed with an intake port below said lubricant level, and other gear means in said case, operatively associated with said first-named gear means.

5. In a device of the class described, a first vertical shaft, a gear case receiving the lower end of said shaft with the bottom wall of said case spaced below the said shaft end, a bladed element carried on said shaft end and extending below the level of a pool of liquid lubricant in said case, gear means carried on said shaft above said bladed element, a cup-shaped shroud supported in said case and partially enshrouding said bladed element, the bottom of said shroud being disposed below the lubricant level and the flaring, annular wall of said shroud extending above said level, said shroud being formed with an intake port below said lubricant level, and other gear means in said case, operatively associated with said first-named gear means, the free ends of the blades of said bladed element being shaped to approach the annular wall of said shroud continuously toward the open mouth thereof.

6. The device of claim 5 in which said other gear means is carried on a second vertical shaft penetrating the bottom wall of said case, a standpipe having a liquid-tight seal with said bottom wall, surrounding said second shaft within said case, and having an open top disposed above said lubricant level, and packing means near the open top of said standpipe to provide a lubricant seal between said second shaft and said standpipe.

7. An oil slinger comprising a cup-shaped shroud having an open mouth defined by an annular wall of arcuate cross section, said shroud being disposed with its bottom below, and its mouth above, the surface of an oil pool and having a substantially central port in its bottom, and a rotor substantially concentrically entered in said shroud, said rotor carrying a blade whose radially distal end progressively approaches said annular shroud wall from the bottom thereof toward said shroud mouth and whose upper edge projects above said shroud mouth.

8. A slinger comprising a cup-shaped shroud having an open mouth defined by a flaring annular wall, said shroud being disposed with its bottom below, and its mouth above, the surface of a liquid pool and having a substantially central port in its bottom, and a rotor substantially concentrically entered in said shroud, said rotor carrying a blade whose radially distal end is in proximity to said annular shroud wall from the bottom thereof to said shroud mouth and whose upper edge projects above said shroud mouth.

9. A slinger comprising a cup-shaped shroud having a concavely-arcuate bottom wall and an open mouth defined by an annular wall substantially cylindrical in shape adjacent to said mouth, said shroud being disposed with its bottom below, and its mouth above, the surface of a pool of liquid, and having a port in its bottom for admission of said liquid, and a rotor entered in said shroud, said rotor carrying a blade whose radially distal end is in proximity to said annular wall of said shroud, and whose bottom edge is in proximity to the bottom wall of said shroud, and whose top edge is disposed above said shroud mouth.

References Cited in the file of this patent
UNITED STATES PATENTS

| | | |
|---|---|---|
| 1,378,658 | Clement | May 17, 1921 |
| 1,920,326 | Schuck | Aug. 1, 1933 |
| 2,256,754 | Schmitter | Sept. 23, 1944 |
| 2,649,929 | Wood | Aug. 25, 1953 |

FOREIGN PATENTS

| | | |
|---|---|---|
| 915,043 | Germany | July 15, 1954 |